US010435490B2

(12) United States Patent
Algozzini et al.

(10) Patent No.: US 10,435,490 B2
(45) Date of Patent: Oct. 8, 2019

(54) PREPOLYMERIZED CATALYST COMPONENTS FOR THE POLYMERIZATION OF OLEFINS

(71) Applicant: BASELL POLIOLEFINE ITALIA S.R.L., Milan (IT)

(72) Inventors: Giuseppina Maria Algozzini, Ferrara (IT); Diego Brita, Ferrara (IT); Massimo Cenci, Ferrara (IT); Gianni Collina, Ferrara (IT); Tiziano Dall'occo, Ferrara (IT); Maria Di Diego, Ferrara (IT); Benedetta Gaddi, Ferrara (IT); Ofelia Fusco, Ferrara (IT); Giampiero Morini, Ferrara (IT); Lorella Pedriali, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/750,391

(22) PCT Filed: Jul. 14, 2016

(86) PCT No.: PCT/EP2016/066752
§ 371 (c)(1),
(2) Date: Feb. 5, 2018

(87) PCT Pub. No.: WO2017/021122
PCT Pub. Date: Feb. 9, 2017

(65) Prior Publication Data
US 2018/0230253 A1    Aug. 16, 2018

(30) Foreign Application Priority Data

Aug. 4, 2015  (EP) ................................ 15179708

(51) Int. Cl.
| *C08F 110/02* | (2006.01) |
| *C08F 110/06* | (2006.01) |
| *C08F 10/06*  | (2006.01) |
| *C08F 2/34*   | (2006.01) |
| *C08F 4/649*  | (2006.01) |
| *C08F 4/651*  | (2006.01) |

(52) U.S. Cl.
CPC ............ *C08F 110/06* (2013.01); *C08F 10/06* (2013.01); *C08F 110/02* (2013.01); *C08F 2/34* (2013.01); *C08F 4/6492* (2013.01); *C08F 4/651* (2013.01); *C08F 2500/12* (2013.01); *C08F 2500/15* (2013.01); *C08F 2500/18* (2013.01)

(58) Field of Classification Search
CPC .............................. C08F 110/06; C08F 110/02
See application file for complete search history.

(56) References Cited

U.S. PATENT DOCUMENTS

| 6,451,726 B1    | 9/2002 | Zambon et al. |
| 2012/0083576 A1 | 4/2012 | Collina et al. |
| 2014/0121339 A1 | 5/2014 | Wang et al. |

FOREIGN PATENT DOCUMENTS

| EP | 2607386 A1     | 6/2013 |
| KR | 20010030921 A  | 4/2001 |
| WO | 0104165 A1     | 1/2001 |

OTHER PUBLICATIONS

International Search Report and Written Opinion dated Oct. 12, 2016 (Oct. 12, 2016) for Corresponding PCT/EP2016/066752.

*Primary Examiner* — Catherine S Branch

(57) ABSTRACT

A Prepolymerized catalyst component for the polymerization of olefins comprising a solid catalyst component which comprises Mg, Ti, and chlorine atoms and an electron donor (ID) said prepolymerized catalyst component being characterized by the fact that:
  the electron donor (ID) is constituted by at least 80% mol of 1,3 diethers with respect to the total molar amount of electron donor compounds;
  the prepolymerized catalyst has a porosity due to pores with diameters up to 1 μm of less than 0.2 cm3/g;
  it contains an amount of ethylene prepolymer of less than 45% with respect to the total weight of prepolymerized catalyst.

15 Claims, No Drawings

PREPOLYMERIZED CATALYST COMPONENTS FOR THE POLYMERIZATION OF OLEFINS

This application is the U.S. National Phase of PCT International Application PCT/EP2016/066752, filed Jul. 14, 2016, claiming benefit of priority to European Patent Application No. 151797908.1, filed Aug. 4, 2015, the contents of which are incorporated herein by reference in its entirety.

FIELD OF THE INVENTION

The present invention relates to prepolymerized catalyst components for the polymerization of olefins, in particular propylene, having specific chemical properties and comprising Mg, Ti and an electron donor selected from 1,3 diethers.

BACKGROUND OF THE INVENTION

The catalyst components of the technology are particularly suited for use in gas-phase processes for the polymerization of olefins, in particular propylene.

The advantage of using gas-phase reactor is well known in the art. When correctly operated this kind of polymerization technology is able to produce polymers endowed with valuable properties with a relatively low investment cost.

Reactor throughput is generally pushed to its maximum by increasing gas mass flow rate up to the value allowed by limit fluidization gas velocity. Exceeding this limit, a significant portion of polymer particles is entrained by recirculation gas: as a consequence, gas recirculation pipe and fan sheeting occurs, heat exchangers tubes and distribution grid plug. As a consequence, the maintenance cost becomes higher, the manufacturing time longer and production losses are also involved.

The entrainment velocity is a direct function of particle size and density. Bigger and/or denser particles allow higher fluidization gas velocity and therefore, in order to optimize the gas velocity, polymer density should be kept up to the maximum value allowed by final application grade. In this connection, the presence of small polymeric fractions, so called fines, which may be generated by irregular catalyst fragmentation during the initial stages of polymerization, is to be avoided as it can cause fouling phenomena such as sheeting of the reactor and of auxiliary apparatuses which in certain cases can even force to stop the polymerization plant.

In this connection, the advantage of using pre-polymerized catalysts is twofold; it makes the catalyst particles bigger and also increases their resistance in such a way that the tendency to break under polymerization conditions is decreased. As a consequence, the catalyst is able to produce bigger polymer particles and also the formation of fines is reduced.

For the polymerization plant not equipped with a prepolymerization section directly connected to the polymerization section, it is possible to feed the polymerization reactor with pre-polymerized catalyst coming from a separate batch prepolymerization unit which provides prepolymerized catalyst with amount of prepolymer per catalyst unit much lower than that obtained in the on-line prepolymerization. WO99/48929 exemplifies preparation of a series of catalysts for use in propylene polymerization prepolymerized to an extent of 1 gr. of polyethylene per gr of catalyst.

Usually, the batch prepolymerized catalyst are stored in drums in an oily slurry form. When needed, the slurry is discharged into a recipient where, after an optional dilution with hydrocarbon medium, undergoes to proper homogenization under stirring.

It has been observed that while homogenizing under stirring very small size polymer material (also called Angel Hair) is produced having high tendency to stick to the disperser wall and to the stirrer baffle. Presumably, such polymer material is released by the pre-polymerized polymer particles which are subjected to shear stress during stirring. Although the amount of polymer released is not very high if considered only a single batch, the continuous mode in which the catalyst is fed, homogenized and discharged leads to a constantly growing deposit of polymer in the disperser that may cause blocking of the stirrer.

It is therefore felt the need of a prepolymerized catalyst generating no or very reduced amount of fine polymer material during the dispersion while at the same time providing the proper behavior in gas-phase polymerization. Now it has been surprisingly found that when a prepolymerized catalyst having the following characteristics is used, the formation of angel hair during the dispersion stage is greatly reduced.

SUMMARY OF THE INVENTION

It is therefore an object of the present application an prepolymerized catalyst component for the polymerization of olefins comprising a solid catalyst component which comprises Mg, Ti, and chlorine atoms and an electron donor (ID) said prepolymerized catalyst component being characterized by the fact that:
- the electron donor (ID) is constituted by at least 80% mol of 1,3 diethers with respect to the total molar amount of electron donor compounds,
- the prepolymerized catalyst has a porosity due to pores with diameters up to 1 μm of less than 0.2 cm$^3$/g
- it contains an amount of ethylene prepolymer of less than 45% with respect to the total weight of prepolymerized catalyst.

DETAILED DESCRIPTION OF THE INVENTION

In some embodiments, the solid catalyst component has an average particle size ranging from 20 to 100 μm, including from 25 to 80 μm.

In further embodiments, the porosity is less than 0.15 cm$^3$/g, such as from 0.05 to 0.10 cm$^3$/g.

Among the 1,3-diethers mentioned above, the compounds of formula (I) may be used:

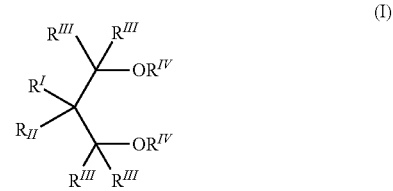

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; and each of the $R^I$ to $R^{IV}$ groups can contain heteroatoms selected from halogens, N, O, S and Si.

In some embodiments, $R^{IV}$ is a 1-6 carbon atom alkyl radical such as a methyl, while the $R^{III}$ radicals may be hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, or cyclopentyl.

Specific examples of ethers that can be used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, in some embodiments 1,3-diethers of formula (II) may be used:

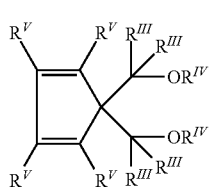

(II)

where the radicals $R^{IV}$ have the same meaning defined in formula (I) and the radicals $R^{III}$ and $R^V$, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ arylalkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^V$ and $R^{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Specially preferred are the compounds of formula (III):

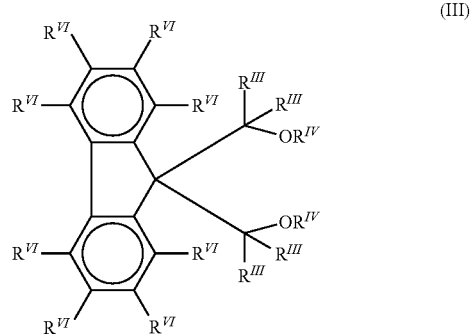

(III)

where the $R^{III}$ and $R^{IV}$ radicals have the same meaning defined in formula (I), $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both.

Specific examples of compounds comprised in formulae (II) and (III) are:
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;

1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

As said, the 1,3-diethers constitutes at least 80% by mol of the total ID present in the solid catalyst component. Preferably, they constitutes at least 90% by mol and more preferably at least 95%. In a most preferred embodiment 1,3-diethers are the only difunctional electron donor compounds present in the solid catalyst component.

When present additional donors are preferably selected from alcohols or carboxylic acid esters.

Preferably, the 1.3-diether/Mg molar ratio ranges from 0.030 to 0.20 and most preferably from 0.035 to 0.15.

In a preferred embodiment the Mg/Ti molar ratio ranges from 4 to 10 and more preferably from 5 to 8.

The amount of ethylene pre-polymer in the pre-polymerized solid catalyst component is less than 40% wt and more preferably ranging from 15 to 35% wt based on the total weight of pre-polymerized solid catalyst component.

The pre-polymerized solid catalyst component is obtainable by subjecting an original solid catalyst component containing Mg, Ti, chlorine and an electron donor selected from 1.3-diethers to pre-polymerization conditions in the presence of the olefin monomer and an Al-alkyl compound.

The terms pre-polymerization conditions means the complex of conditions in terms of temperature, monomer concentration, temperature and amount of reagents suitable to prepare the pre-polymerized catalyst component as defined above.

The alkyl-Al compound (B) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkyl-aluminum halides, alkylaluminum hydrides or alkylaluminum sesquichlorides such as $AlEt_2Cl$ and $Al_2Et_3Cl_3$. The use of tri-n-octylaluminum is especially preferred.

It has been found particularly advantageous to carry out the pre-polymerization using low amounts of alkyl-Al compound. In particular, said amount could be such as to have an Al/catalyst weight ratio from ranging from 0.001 to 10, preferably from 0.005 to 5 and more preferably from 0.01 to 2.5. An external donor selected from silicon compounds, ethers, esters, amines, heterocyclic compounds, ketones and 1,3-diethers of the general formula (I) previously reported can also be employed. However, use of an external donor in pre-polymerization is not strictly necessary.

The pre-polymerization can be carried out in liquid phase, (slurry or bulk) or in gas-phase at temperatures generally ranging from −20 to 80° C. preferably from 0° C. to 75° C. Preferably, it is carried out in a liquid diluent in particular selected from liquid light hydrocarbons. Among them, pentane, hexane and heptane are preferred. In an alternative embodiment the pre-polymerization can be carried out in a more viscous medium in particular having a kinematic viscosity ranging from 5 to 100 cSt at 40° C. Such a medium can be either a pure substance or a homogeneous mixture of substances having different kinematic viscosity. Preferably, such a medium is an hydrocarbon medium and more preferably it has a kinematic viscosity ranging from 10 to 90 cSt at 40° C.

The original catalyst component concentration in the liquid diluent preferably ranges from 10 to 300 g/l, more preferably from 40 to 200 g/l.

The pre-polymerization time can range from 0.25 to 30 hours, particularly from 0.5 to 20 hours and more specifically from 1 to 15 hours. The olefin monomer to be pre-polymerized can be fed in a predetermined amount and in one step in the reactor before the prepolymerization. In an alternative embodiment the olefin monomer is continuously supplied to the reactor during polymerization at the desired rate.

The original solid catalyst component not containing the olefin polymer is preferably characterized by a porosity, measured by the mercury method, due to pores with radius equal to or lower than 1 μm, ranging from 0.15 cm3/g to 1.5 cm3/g, preferably from 0.3 cm3/g to 0.9 cm3/g and more preferably from 0.4 to 0.9 cm3/g.

The original solid catalyst component and the solid catalyst component as well, comprises, in addition to the above mentioned electron donors, a titanium compound having at least a Ti-halogen bond and a Mg halide. The magnesium halide is preferably MgCl2 in active form which is widely known from the patent literature as a support for Ziegler-Natta catalysts. U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present technology are TiCl4 and TiCl3; furthermore, also Ti-haloalcoholates of formula $Ti(OR)_{n-y}X_y$ can be used, where n is the valence of titanium, y is a number between 1 and n−1 X is halogen and R is a hydrocarbon radical having from 1 to 10 carbon atoms.

Preferably, the original catalyst component (a) has an average particle size ranging from 20 to 60 μm.

As mentioned, the prepolymerized catalyst of the present disclosure can be stored in hydrocarbon slurry before use. It has been found that when discharged in a vessel and subjected to dilution and homogeneizing conditions (Angel Hair test) the amount of fine polymer released is negligible with respect to the amount released by prepolymerized catalysts of the prior art.

In view of the above, it is an embodiment of the present disclosure a process for the preparation of a catalyst slurry comprising (i) prepolymerizing a solid catalyst component comprising Mg, Ti, and chlorine atoms and an electron donor compound or mixture (ID) comprising at least 80% mol of 1,3 diethers with respect to the total molar amount of electron donor compounds, with ethylene producing less than 45% wt of polyethylene with respect to the total weight of prepolymerized catalyst; (ii) dispersing said prepolymerized catalyst into a hydrocarbon slurry, said catalyst slurry being characterized by the fact that when subject to the Angel Hair test it releases less than 1% wt preferably less than 0.5% wt of fine polymer with respect to the total amount of slurry. The prepolymerized solid catalyst components according to the present technology are used in the polymerization of olefins by reacting them with organoaluminum compounds according to known methods.

In particular, it is an object of the present technology a catalyst for the polymerization of olefins $CH_2=CHR$, wherein R is hydrogen or a $C_1$-$C_{12}$ hydrocarbyl radical comprising the product of the reaction between:
 (i) the prepolymerized solid catalyst component as disclosed above,
 (ii) an alkylaluminum compound and, optionally,
 (iii) an external electron donor compound.

The alkyl-Al compound (ii), which can be the same used in the pre-polymerization, is preferably chosen among the trialkyl aluminum compounds such as triethylaluminum, tri-n-hexylaluminum, tri-n-octylaluminum. It is also possible to use mixtures of trialkylaluminums with alkylaluminum halides, alkylaluminum hydrides or alkylaluminum sesquichlorides such as $AlEt_2Cl$ and $Al_2Et_3Cl_3$.

In some embodiments, the aluminum alkyl compound should be used in the gas-phase process in amount such that the Al/Ti molar ratio ranges from 10 to 400, including from 30 to 250 and from 40 to 200.

The catalyst system may include external electron-donors (ED) selected from several classes. Among ethers, the 1,3 diethers also disclosed as internal donors in the solid catalyst component (a) may be used. Among esters, the esters of aliphatic saturated mono- or dicarboxylic acids such as malonates, succinates and glutarates may be used. Among heterocyclic compounds, 2,2,6,6-tetramethyl piperidine may be used. In certain embodiments, external donor compounds of silicon having at least a Si—O—C bond may be used. In further embodiments, the silicon compounds may be of the formula Ra5Rb6Si(OR7)c, where a and b are integer from 0 to 2, c is an integer from 1 to 3 and the sum (a+b+c) is 4; R5, R6, and R7, are alkyl, cycloalkyl or aryl radicals with 1-18 carbon atoms, optionally containing heteroatoms selected from N, O, halogen and P. In some embodiments, methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1, trifluoropropyl-2-ethylpiperidinyl-dimethoxysilane and 1,1, 1,trifluoropropyl-metil-dimethoxysilane may be used. In certain embodiments, the external electron donor compound is used in such an amount as to give a molar ratio between the organoaluminum compound and said electron donor compound of from 2 to 200, including from 5 to 150, from 7 to 100 and from 7 to 70.

The prepolymerized catalyst is suited for use in any polymerization technology and especially for gas-phase polymerization. The gas-phase process can be carried out with any type of gas-phase reactor, including operating in one or more fluidized or mechanically agitated bed reactors. Typically, in the fluidized bed reactors the fluidization is obtained by a stream of inert fluidization gas, the velocity of which is not higher than the transport velocity. As a consequence the bed of fluidized particles can be found in a more or less confined zone of the reactor. In the mechanically agitated bed reactor the polymer bed is kept in place by the gas flow generated by the continuous blade movement, the regulation of which also determines the height of the bed. The operating temperature is typically selected between 50 and 85° C., including between 60 and 85° C., while the operating pressure is generally set from 0.5 and 8 MPa, such as between 1 and 5 MPa and between 1.0 and 3.0 MPa. Inert fluidization gases are also useful to dissipate the heat generated by the polymerization reaction and are selected from nitrogen or saturated light hydrocarbons such as propane, pentane, hexane or mixture thereof.

The polymer molecular weight can be controlled by using the proper amount of hydrogen or any other suitable molecular weight regulator such as $ZnEt_2$. If hydrogen is used, the hydrogen/propylene molar ratio is generally comprised between 0.0002 and 0.5, the propylene monomer being comprised from 20% to 100% by volume, such as from 30 to 70% by volume, based on the total volume of the gases present in the reactor. The remaining portion of the feeding mixture is optionally comprised of inert gases and one or more α-olefin comonomers.

Another gas-phase technology for use with the present disclosure is gas-phase polymerization devices comprising at least two interconnected polymerization zones. In some embodiments, the process is carried out in a first and second interconnected polymerization zone, to which propylene and ethylene or propylene and alpha-olefins are fed in the presence of a catalyst system, and from which the polymer produced is discharged. The growing polymer particles flow through the first of the polymerization zones (riser) under fast fluidization conditions, leave the first polymerization zone and enter the second polymerization zone (downcomer), through which they flow in a densified form under the action of gravity, leave the second polymerization zone and are reintroduced into the first polymerization zone, thus establishing a circulation of polymer between the two polymerization zones. In certain embodiments, the conditions of fast fluidization in the first polymerization zone are established by feeding the monomers gas mixture below the point of reintroduction of the growing polymer into the first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Also in this case, one or more inert gases, such as nitrogen or an aliphatic hydrocarbon, are maintained in the polymerization zones, in such quantities that the sum of the partial pressures of the inert gases may be between 5 and 80% of the total pressure of the gases. The operating temperature ranges from 50 and 85° C., such as between 60 and 85° C., while the operating pressure ranges from 0.5 to 10 MPa, including between 1.5 and 6 MPa. In certain embodiments, the catalyst components are fed to the first polymerization zone at any point. However, they can also be fed at any point of the second polymerization zone. The use of a molecular weight regulator is carried out under the previously described conditions. By the use of the means described in WO00/02929 it is possible to totally or partially prevent the gas mixture present in the riser entering the downcomer; in some embodiments, this result may be obtained by introducing in the downer a gas and/or liquid mixture having a composition different from the gas mixture present in the riser. According to a one embodiment of the present technology, the introduction into the downcomer of the gas and/or liquid mixture having a composition different from the gas mixture present in the riser is effective in preventing the latter mixture from entering the downcomer. Therefore, it is possible to obtain two interconnected polymerization zones having different monomer compositions and thus able to produce polymers with different properties.

In addition to the low release of fine polymer material in the dispersion stage, the prepolymerized catalyst component of the present disclosure also shows self-extinguishing properties that ensure reduced or absent fouling problems during polymerization. In some embodiments, self-extinguishing properties are present if the polymerization activity at temperature higher than 85° C. is 70% or less, such as 65% or less and 60% or less, of the value of the polymerization activity at 70° C. This characteristic is very important because one of the causes of fouling comes from fine growing particles which tend to deposit onto, and electrostatically adhere to, the inner walls of the reactor and of the heat exchanger. As a result, they grow in size by polymerization, causing an insulating effect and a lower heat transfer, resulting in the formation of hot spots in the reactor. However, a significant reduction of catalyst activity as accomplished by the present technology when the temperature increases arrests particle growth.

EXAMPLES

The following examples are given in order to better illustrate the technology without limiting it in any manner.
Characterization
Determination of X.I.
2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the xylene insolubility percentage (X.I. %).
Average Particle Size of the Adduct, Catalysts and Pre-Polymers
Determined by a method based on the principle of the optical diffraction of monochromatic laser light with the "Malvern Instr. 2600" apparatus. The average size is given as P50.
Melt Flow Rate (MFR)
Determined according to ISO 1133 (230° C., 2.16 Kg)
Porosity and Surface Area with Mercury:
The measure is carried out using a "Porosimeter 2000 Series" instrument by Carlo Erba. The porosity is determined by absorption of mercury under pressure. For this determination use is made of a calibrated dilatometer (diameter 3 mm) CD3 (Carlo Erba) connected to a reservoir of mercury and to a high-vacuum pump (1.10-2 mbar). A weighed amount of sample is placed in the dilatometer. The apparatus is then placed under high vacuum (<0.1 mm Hg) and is maintained at these conditions for 20 minutes. The dilatometer is then connected to the mercury reservoir and the mercury is allowed to flow slowly into the dilatometer until it reaches the level marked on the dilatometer at a height of 10 cm. The valve that connects the dilatometer to the vacuum pump is closed and then the mercury pressure is gradually increased with nitrogen up to 140 kg/cm$^2$. Under the effect of the pressure, the mercury enters the pores and the level goes down according to the porosity of the material.

The porosity (cm$^3$/g), due to pores up to 1 μm for catalysts (10 μm for polymers), the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

Poured Bulk Density [g/cm$^3$]:
measured according to DIN-53194
The test is carried out in an agitated vessel (volume 2.5 liters), equipped with dual impeller system, motor and speed regulator with display, thermostatic bath. The type of impeller is a Pitched blade turbine with 45° angle. The impeller to tank diameter ratio was 0.6. The reactor is filled up at 65% vol with the catalyst slurry prepared as described in Example 1. A tip speed of 2 m/s is maintained for 4 hours at a temperature of 40° C.

After that time, the stirring is stopped and the suspension is sieved through 1 mm mesh. The metallic sieve, the vessel and the stirrer are washed with hexane until no material is washed out. Finally the polymeric material adhering to the filter, vessel and stirrer is dried, collected and weighed.

The amount of angel hair (average of 5 measurement) is expressed as the % of the weight of said polymeric material with respect to the total weight of the charged slurry. General procedure for the preparation of MgCl$_2$.(EtOH)$_m$ adducts.

An initial amount of microspheroidal MgCl$_2$.2.8C$_2$H$_5$OH was prepared according to the method described in Example 2 of U.S. Pat. No. 4,399,054 but operating at 3,000 rpm instead of 10,000. The final particle size was determined to be P$_{50}$=28 μm.

Preparation of Solid Catalyst Component—General Procedure.

Into a 3.0-liter round bottom flask, equipped with mechanical stirrer, cooler and thermometer 2.0 L of TiCl$_4$ were introduced at room temperature under nitrogen atmosphere. After cooling at −5° C., while stirring, 100 g of microspheroidal prepared as disclosed in the general procedure were introduced. The temperature was then raised from −5° C. up to 40° C. at a speed of 0.4° C./min. When the temperature of 40° C. was reached, 26.7 g of 9,9-bis (methoxymethyl)fluorene, as internal donor, was introduced. At the end of the addition, the temperature was increased up to 100° C. at a speed of 0.8° C./min and maintained at this value for 60 minutes. Thereafter, stirring was stopped, the solid product was allowed to settle and the supernatant liquid was siphoned off, maintaining the temperature at 100° C. After the supernatant was removed, an additional 1.9 L of fresh TiCl$_4$ were added and the mixture was then heated at 110° C. and kept at this temperature for 30 minutes. Once again the stirring was interrupted; the solid product was allowed to settle and the supernatant liquid was siphoned off, maintaining the temperature at 110° C. A third aliquot of fresh TiCl$_4$ (1.9 L) was added, the mixture was maintained under agitation at 110° C. for 30 minutes and then the supernatant liquid was siphoned off. The solid was washed with anhydrous i-hexane five times (5×1.0 L) in a temperature gradient up to 60° C. and one time (1.0 L) at room temperature. The solid was finally dried under vacuum and analyzed. Catalyst composition: Mg=15.1 wt %; Ti=4.4 wt %; I.D.=14.5 wt %; $P_{50}$=41.2 µm.

General Procedure for Gas Phase Propylene Polymerization

A fluidized bed reactor, equipped with recirculation gas compressor, heat exchanger, and automated temperature controller was used to polymerize propylene in gas phase. A catalyst mud comprising the prepolymerized catalyst is fed to a stirred vessel which is also continuously fed with propane. The mixture is stirred at 20° C. and continuously fed, through a propylene pick-up, to the gas-phase reactor. In a continuous and constant propylene flow, aluminum triethyl (TEAL), methyl-cyclohexyl dimethoxy silane (CMMS) as an external donor, and hydrogen (used as molecular weight regulator) are fed to the fluidized bed reactor which is set at the polymerization temperature of 75° C., pressure 27 barg.

The polymer particles exiting the reactor are subjected to a steam treatment to remove the reactive monomers and volatile substances, and then dried.

EXAMPLES

Example 1

Preparation of the Pre-Polymerized Catalyst

Into a 2 liter glass-vessel/stainless steel autoclave with a mechanical anchor stirrer, at room temperature and under a nitrogen atmosphere, 1 liter of i-hexane containing 1.6 g of tri-n-octyl aluminum (TNOA) and 80 g of the spherical catalyst prepared as described above were introduced. The stirring was set at about 500 rpm, and the internal temperature was set to 20° C. for a time period of 20 minutes. Maintaining constant the temperature of the reactor, ethylene was carefully introduced with a constant flow for about 8 hours. The polymerization was discontinued when a theoretical conversion of 0.5 g of polymer per g of catalyst was reached. The resulting pre-polymerized catalyst was dried under vacuum at room temperature and analyzed. It contained 0.52 g of polyethylene per g of solid catalyst (34% polymer). Prepolymer composition: Mg=8.4 wt %; Ti=2.98 wt %; I.D.=10.3 wt %; P50=35 µm. The catalyst component was then used in a double run gas phase polymerization of propylene according to general procedure carried out at 70° C. and 90° C., respectively.

Preparation of Pre-Polymerized Catalyst Suspension

A slurry of the prepolymerized catalyst component is prepared by dispersing the catalyst dry particle in Winog 70 mineral oil and by adding hexane to a final amount of 13% wt with respect to the weight of dry catalyst+hexane. The final slurry concentration is 30% wt of dry catalysts with respect to the total weight of slurry (catalyst+oil+hexane).

The so prepared suspension was subjected to the Angel Hair formation test and the result was 0.1%

Example 2

The catalyst component was prepared as described in Example 1, except that the pre-polymerization was discontinued when a theoretical conversion of 0.35 g of polyethylene per g of catalyst was reached.

The Angel Hair test was performed as described in Example 1. The result was that no amount of Angel Hair was formed.

Comparative Example 1

The catalyst component was prepared as described in Example 1 except that the pre-polymerization was discontinued when a theoretical conversion of 1 gram of polyethylene per g of catalyst was reached.

The Angel Hair test was performed as described in Example 1. The result was that 1.4% amount of Angel Hair was formed.

Polymerizations

The prepolymerized catalyst components of Example 2 and Comparative Example 1 have been employed in the gas-phase polymerization of propylene according to the general procedure disclosed above. Specific conditions and results are shown in Table 1.

TABLE 1

|  | Ex. 2 | Comp. Ex. 1 |
| --- | --- | --- |
| Temperature (° C.) | 75 | 75 |
| Pressure (barg) | 27 | 27 |
| TEAL/CAT wt/wt | 7 | 5 |
| TEAL/Donor wt/wt | 35 | 33 |
| $H_2/C_3^-$ mol/mol | 0.0007 | 0.001 |
| MIL g/10' | 1.8 | 1.7 |
| XS wt % | 2.7 | 2.6 |
| Bulk density | 0.395 | 0.418 |
| Fines <125 µm (% wt) | 0.5. | 0.5 |
| Mileage kg/g | 14.4 | 10.7 |

What is claimed is:

1. A prepolymerized catalyst component for the polymerization of olefins comprising a solid catalyst component which comprises Mg, Ti, and chlorine atoms and an electron donor (ID), said prepolymerized catalyst component being characterized by:
    the electron donor (ID) comprises at least 80% mol of 1,3-diethers with respect to the total molar amount of electron donor compounds;
    the prepolymerized catalyst has a porosity due to pores with diameters up to 1 µm of less than 0.2 $cm^3/g$; and
    the said prepolymerized catalysts component comprises an amount of ethylene prepolymer of less than 45% with respect to the total weight of prepolymerized catalyst.

2. The prepolymerized catalyst component according to claim 1, wherein the ID/Mg molar ratio ranges from 0.030 to 0.20.

3. The prepolymerized catalyst component according to claim 1, wherein the ID/Mg molar ratio ranges from 0.035 to 0.15.

4. The prepolymerized catalyst component according to claim 1, wherein the Mg/Ti molar ratio ranges from 4 to 10.

5. The prepolymerized catalyst component according to claim 1, in which the amount of ethylene pre-polymer is less than 40% wt based on the total weight of pre-polymerized solid catalyst component.

6. The prepolymerized catalyst component according to claim 4, in which the amount of ethylene pre-polymer ranges from 15 to 35% wt based on the total weight of pre-polymerized solid catalyst component.

7. The prepolymerized catalyst component according to claim 1, having an average particle size ranging from 20 to 100 µm.

8. The prepolymerized catalyst component according to claim 1, in which the porosity is less than 0.15 $cm^3/g$.

9. The prepolymerized catalyst component according to claim 1, in which the porosity ranges from 0.05 to 010 $cm^3/g$.

10. The prepolymerized catalyst component according to claim 1, in which the electron donor compound (ID) is selected from the compounds of formula (I)

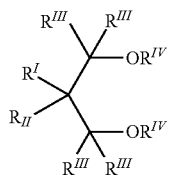

where $R^I$ and $R^{II}$ are the same or different and are hydrogen or linear or branched $C_1$-$C_{18}$ hydrocarbon groups which can also form one or more cyclic structures; the $R^{III}$ groups, equal or different from each other, are hydrogen or $C_1$-$C_{18}$ hydrocarbon groups; the $R^{IV}$ groups equal or different from each other, have the same meaning of $R^{III}$ except that they cannot be hydrogen; and each of the $R^I$ to $R^{IV}$ groups optionally contains heteroatoms selected from halogens, N, O, S and Si.

11. The prepolymerized catalyst component according to claim 1, wherein the electron donor (ID) is selected among 1,3-diethers of formula (III):

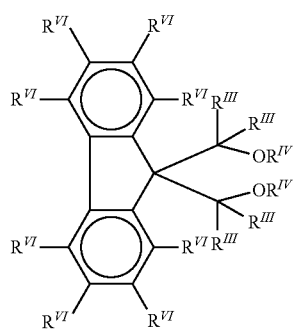

where the $R^{III}$ and $R^{IV}$ radicals have the same meaning defined in formula (I), $R^{VI}$ radicals equal or different are hydrogen; halogens, selected from $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si, Cl and F, as substitutes for carbon or hydrogen atoms, or both.

12. The pre-polymerized catalyst according to claim 1, comprising a Ti-halogen bond and a Mg halide.

13. A catalyst system for the polymerization of olefins $CH_2$=CHR, in which R is hydrogen or a hydrocarbyl radical with 1-12 carbon atoms, comprising the product of the reaction between:

(i) the prepolymerized solid catalyst component according to claim 1, (ii) an alkylaluminum compound and optionally (iii) an external electron donor compound.

14. A catalyst system according to claim 13, in which the external electron donor is selected from silicon compounds of formula $Ra^5Rb^6Si(OR^7)c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms selected from N, O, halogen and P.

15. A gas-phase process for the polymerization of olefins $CH_2$=CHR, wherein R is hydrogen or a $C_1$-$C_{12}$ hydrocarbyl group, comprising contacting the olefins with the catalyst system according to claim 13.

* * * * *

UNITED STATES PATENT AND TRADEMARK OFFICE
CERTIFICATE OF CORRECTION

PATENT NO. : 10,435,490 B2
APPLICATION NO. : 15/750391
DATED : October 8, 2019
INVENTOR(S) : Algozzini et al.

It is certified that error appears in the above-identified patent and that said Letters Patent is hereby corrected as shown below:

On the Title Page

Column 2, Item (57), Line 10, delete "cm3/g;" and insert -- $cm^3/g$; --, therefor In the Specification In Column 6, Line 32, delete "cm3/g" and insert -- $cm^3/g$ --, therefor In Column 6, Line 33, delete "cm3/g," and insert -- $cm^3/g$, --, therefor In Column 6, Line 33, delete "cm3/g" and insert -- $cm^3/g$ --, therefor In Column 6, Line 33, delete "cm3/g" and insert -- $cm^3/g$ --, therefor In Column 6, Line 34, delete "cm3/g." and insert -- $cm^3/g$. --, therefor In Column 6, Line 39, delete "MgCl2" and insert -- $MgCl_2$ --, therefor In Column 6, Line 52, delete "TiCl4" and insert -- $TiCl_4$ --, therefor In Column 6, Line 52, delete "TiCl3;" and insert -- $TiCl_3$; --, therefor Signed and Sealed this
Twelfth Day of July, 2022

Katherine Kelly Vidal
*Director of the United States Patent and Trademark Office*